(12) United States Patent
Bauch et al.

(10) Patent No.: US 9,759,259 B2
(45) Date of Patent: Sep. 12, 2017

(54) ROLLING-ELEMENT BEARING HAVING AN OBLIQUE RUNNING SURFACE SECTION

(71) Applicants: Riad Bauch, Würzburg (DE); Eve Goujon, Würzburg (DE); Norbert Huhn, Schweinfurt (DE)

(72) Inventors: Riad Bauch, Würzburg (DE); Eve Goujon, Würzburg (DE); Norbert Huhn, Schweinfurt (DE)

(73) Assignee: AKTIEBOLAGET SKF, Gothenburg (SE)

(*) Notice: Subject to any disclaimer, the term of this patent is extended or adjusted under 35 U.S.C. 154(b) by 3 days.

(21) Appl. No.: 14/803,608

(22) Filed: Jul. 20, 2015

(65) Prior Publication Data

US 2016/0017921 A1    Jan. 21, 2016

(30) Foreign Application Priority Data

Jul. 18, 2014  (DE) .................. 10 2014 213 996

(51) Int. Cl.

| | |
|---|---|
| *F16C 33/58* | (2006.01) |
| *F16C 19/26* | (2006.01) |
| *F16C 33/66* | (2006.01) |
| *F16F 15/26* | (2006.01) |
| *F16C 19/46* | (2006.01) |

(52) U.S. Cl.
CPC ............ *F16C 33/585* (2013.01); *F16C 19/26* (2013.01); *F16C 33/6681* (2013.01); *F16C 19/46* (2013.01); *F16C 2300/02* (2013.01); *F16F 15/267* (2013.01)

(58) Field of Classification Search
CPC .. F16C 3/20; F16C 19/26; F16C 19/46; F16C 33/585; F16C 33/6681; F16C 2300/02; F16F 15/267; F02B 75/06; Y10T 74/2183
USPC ........ 384/445, 456, 475, 560–561, 564–565, 384/587–588; 123/192.2
See application file for complete search history.

(56) References Cited

U.S. PATENT DOCUMENTS

| | | | |
|---|---|---|---|
| 3,975,067 A | | 8/1976 | Martin |
| 5,249,872 A | * | 10/1993 | Rhodes ................... F16C 19/26 384/574 |
| 5,281,036 A | * | 1/1994 | Rhodes ................... F16C 19/26 384/574 |
| 5,529,402 A | * | 6/1996 | Murphy .................. F16C 19/46 384/564 |

(Continued)

FOREIGN PATENT DOCUMENTS

| | | |
|---|---|---|
| DE | 000002422488 A1 | 1/1975 |
| DE | 102009035684 A1 | 2/2011 |

(Continued)

*Primary Examiner* — Marcus Charles
(74) *Attorney, Agent, or Firm* — Bryan Peckjian; SKF USA Inc. Patent Dept.

(57) ABSTRACT

A rolling-element bearing with line contact includes bearing inner and outer parts having running surfaces, and at least one rolling element is disposed between and makes line contact with the bearing inner and outer parts. A width of the outer running surface and/or a width of the inner running surface is narrower at least in a first circumferential partial region than a length of the rolling-element, and in the first partial region the bearing outer part running surface and/or the bearing inner part running surface extends obliquely to a rolling direction of the at least one rolling element.

17 Claims, 4 Drawing Sheets

(56) References Cited

U.S. PATENT DOCUMENTS

| | | | | |
|---|---|---|---|---|
| 5,902,022 | A * | 5/1999 | Shattuck | F16C 19/26 384/569 |
| 6,176,623 | B1 * | 1/2001 | Zeigler | F16C 19/46 29/898.062 |
| 8,157,451 | B2 * | 4/2012 | Solfrank | F16C 19/46 384/457 |
| 8,413,631 | B2 | 4/2013 | Herzog et al. | |
| 8,539,860 | B2 * | 9/2013 | Waseda | F01L 1/047 74/595 |
| 8,858,087 | B2 * | 10/2014 | Gibbons | F16C 25/06 384/492 |
| 9,353,794 | B2 * | 5/2016 | Pabst | F16C 19/466 |
| 9,360,049 | B2 * | 6/2016 | Pabst | F16C 35/067 |
| 9,447,821 | B2 * | 9/2016 | Abrahamson | F16C 19/225 |
| 9,551,376 | B2 * | 1/2017 | Pabst | F16C 19/54 |
| 2012/0008893 | A1 | 1/2012 | Oishi et al. | |

FOREIGN PATENT DOCUMENTS

| | | |
|---|---|---|
| DE | 102009036794 A1 | 2/2011 |
| DE | 102009049468 A1 | 4/2011 |
| EP | 1775484 A2 | 4/2007 |
| FR | 2902848 A1 | 12/2007 |
| JP | 200839035 A | 9/2009 |
| JP | 2009204125 A | 9/2009 |

\* cited by examiner

ROLLING-ELEMENT BEARING HAVING AN OBLIQUE RUNNING SURFACE SECTION

CROSS-REFERENCE

This application claims priority to German patent application no. 10 2014 213 996.1 filed on Jul. 18, 2014, the contents of which are fully incorporated herein by reference.

TECHNOLOGICAL FIELD

The present disclosure is directed to a rolling-element bearing with line contact including a bearing outer part and a bearing inner part that each form a running surface for at least one rolling element disposed therebetween. The rolling element with line contact contacts those running surfaces along a line as it rolls.

BACKGROUND

All rolling-element bearings other than ball bearings are usually referred to as "rolling-element bearings with line contact." These include, for example, cylindrical roller bearings and tapered roller bearings as well as radial needle roller bearings and toroidal roller bearings. One problem with rolling-element bearings with line contact is that it may be difficult to distribute lubricant over the entire length of the rolling elements. This may result in too little lubricant being available in the inner or central region of the contact line.

A radial needle roller bearing is known from EP 1 775 484 (a family member of US 2007/177837) the inner running surface of which is tapered in a partial region. The needle rollers are thus locally and temporarily located over the bearing seat so that lubricant can be guided directly onto the needle rollers. However, a disadvantage of this arrangement is that the needle rollers are not well supported in the strongly tapered region. In addition, parts of some of the needle rollers are constantly covered by the bearing seat and may not be adequately supplied with lubricant. In particular the central region of the rolling elements are the most heavily loaded.

SUMMARY

An aspect of the present disclosure is therefore to provide improved lubrication for a rolling-element bearing with line contact.

According to the disclosure a rolling-element bearing with line contact includes a bearing outer part and a bearing inner part, each of which forms a running surface for at least one rolling element disposed between the inner and outer parts. The rolling-element bearing contacts these running surfaces along a line when it rolls. Furthermore, the at least one rolling element has an axial rolling-element length, the running surface of the bearing outer ring has an axial outer running surface width, and the running surface of the bearing inner ring has an axial inner running surface width. The outer running surface width and/or the inner running surface width is narrower than the rolling-element width in at least a first circumferential partial region of the rolling element.

In order to improve lubrication of the rolling element along its entire length and guide lubricant to all points on the rolling element, the disclosure configures at least one of the running surfaces in the first partial region to extend obliquely to a rolling direction of the at least one rolling element. Due to the obliquely extending running surface, different partial regions of the rolling-element length are periodically covered and exposed so that the lubricant, in particular a lubricant mist, can reach all parts of the rolling element, and thus lubrication is improved overall.

It is particularly advantageous if the first partial region is formed on a region of the rolling-element bearing that will only be subjected to a minimal load. Thus, for example, in the case of rolling-element bearings subjected to stationary load on the outer ring, the running surface of the outer ring can be configured to include an obliquely extending portion. In the case of radial loads that arise from rotational movement, for example, while radially supporting an unbalanced shaft, the inner part of the rolling-element bearing has a load zone with respect to its circumference, and the oblique running surface can be formed outside the load zone. This has the advantage that radial support is dimensioned according to the expected load in the region of the load zone the, but an overdimensioning of the radial bearing outside the load zone is avoided. As a result, weight and material, and thus costs, can be saved. In addition, the size of the high-precision rolling-element bearing running surfaces to be produced can be reduced, which also reduces costs.

Thus according to a further exemplary embodiment the oblique configuration of the running surfaces does not extend over the entire circumferential surface of the rolling-element bearing, but rather in a second circumferential partial region of the rolling-element bearing at least one of the running surfaces is configured (runs) substantially parallel to the rolling direction of the at least one rolling element. Such arrangement helps ensure that the rolling-element bearing also provides sufficient support for the rolling elements, particularly in the load zone of a radial bearing assembly of an unbalanced shaft.

It is particularly preferred that the outer running surface width and/or the inner running surface width in the second circumferential partial region is greater than or substantially equal to a length of the rolling-elements. This helps ensure a particularly good supporting of the rolling elements.

According to a further advantageous exemplary embodiment, at least one of the running surfaces in the first partial region includes an undulation or serration oriented in an axial direction. For example, the running surface can have a Z-shape or an M-shape. Of course any other shape can also be formed that provides an oblique running surface. However, the disclosed embodiments advantageously are particularly simple to manufacture.

According to a further advantageous exemplary embodiment the inner part and/or the outer part includes, at least in the second partial region, at least one flange for axially supporting the rolling elements. Such flanges, also known as guide flanges and retaining flanges, serve to axially retain the rolling elements.

In a further exemplary embodiment at least one lubricant channel is formed in the outer part and/or the inner part of the rolling-element bearing that is at least partially open to the running surface. Lubricant can thus easily reach the difficult-to-access parts of the rolling-element bearing, and simultaneously, the width of the running surface can be relatively large even in the first partial region. In this manner particularly good support for the rolling elements can be provided even in the first partial region.

It is particularly advantageous if the lubricant channel is configured such that the rolling elements are also supported by the running surfaces in the region of the lubricant channel. Such support can be provided if the lubricant channel has a length in a longitudinal direction, at least in the region open to the running surface, that is set at an angle to the line of line contact of the rolling elements. This angled configuration helps ensure that at least parts of the rolling elements always make line contact with the running surfaces.

If, as described above, a flange for securing the rolling elements axially is formed on the inner part and/or outer part, at least one bore may be formed in the flange, which bore is fluidly connected to the lubricant channel. This further helps ensure that lubricant can be guided directly onto the rolling elements.

It should also be mentioned that the lubricant channel can be formed in the second partial region instead of or in addition to the first partial region. In this manner, the rolling elements in the first partial region can be supplied with lubricant via the oblique running surface, while the rolling elements in the second partial region can be supplied with lubricant via the lubricant channel. Of course it is also possible to provide a plurality of lubricant channels in both the first and the second partial regions.

This configuration is particularly advantageous when the running surfaces of the inner and/or outer parts comprise a bearing seat of a radial bearing assembly, in particular of a radial bearing assembly of an unbalanced shaft. It is particularly important to provide good lubrication for unbalanced shafts, and the inventive obliquely extending raceway helps ensure that lubricant can be brought to all regions of the rolling-element bearing. At the same time lubricant can also be guided into the load zone of the unbalanced shaft and onto the rolling elements via the disclosed lubricant channel.

Further advantages and advantageous embodiments are described in the dependent claims, the description, and the drawings.

In the following discussion, embodiments are described in more detail with reference to the exemplary embodiments depicted in the drawings. The exemplary embodiments are of a purely exemplary nature and are not intended to establish the scope of the application. The scope is defined solely by the appended claims.

BRIEF DESCRIPTION OF THE DRAWINGS

FIG. 3b is a schematic side elevational view of part of the bearing inner part of FIG. 3a.

FIG. 3c shows an alternative embodiment of the lubricant channel of FIG. 3a.

DETAILED DESCRIPTION

In the following discussion, identical or functionally equivalent elements are designated by the same reference numerals.

Figure 1:
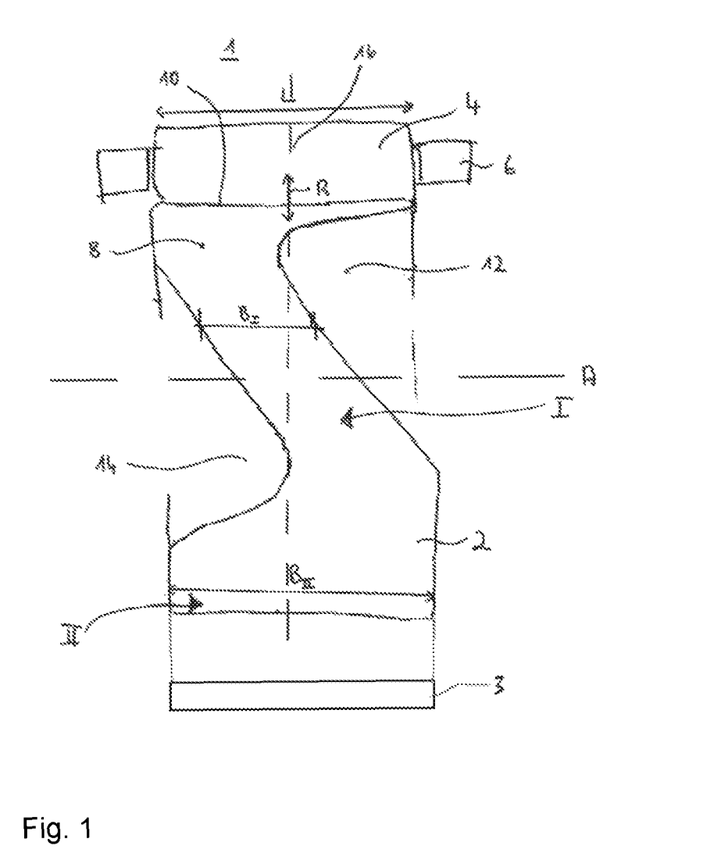
FIG. 1 is a schematic plan view of part of a rolling-element bearing according to a first exemplary embodiment of the disclosure.
Figure 5:
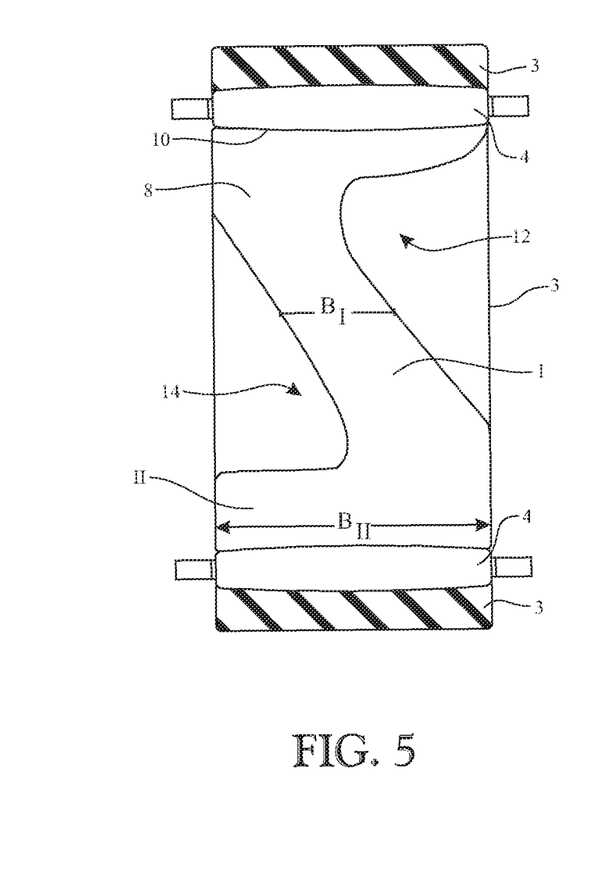
FIG. 5 is an elevational view, partly in section, showing the inner and outer parts of the rolling element bearing of FIG. 1.

FIG. 1 is a schematic plan view of part a rolling-element bearing 1 including an inner part 2, an outer part 3, a rolling element 4 and a cage 6 The outer part 3 radially surrounds and enclose the rolling-element bearing 1 or the rolling element 4 as illustrated in FIG. 1 and FIG. 5. As depicted in FIG. 1, the inner part 2 and the outer part 3 share a common rotational axis A, although only one of the inner part 2 and the outer part 3 is generally mounted for rotation about that axis A while the other part is rotationally fixed. The rolling elements 4 move along the inner part 2 in direction R. Furthermore, a running surface 8 is formed on the inner part 2, and the rolling elements 4 contact the running surface 8 along a line 10.

Since the rolling elements 4 are configured to contact the running surface 8 of the inner part 2 along the line 10, the so-called contact line, such a rolling-element bearing 1 is also referred to as a rolling-element bearing with line contact. The rolling elements 4 themselves may have a cylindrical shape like the depicted needle roller bearing; however it is also possible to use tapered or toroidal rolling elements. Only ball bearings, bearings that make point contact with a running surface, are not included in the category of rolling-element bearings with line contact.

With continued reference to FIG. 1, the inner part 2 includes a first partial region I and a second partial region II, and an axial width BI of the running surface 8 in the first partial region I is smaller than an axial width BII of the running surface 8 in the second partial region II. The axial widths BI, BII are measured substantially parallel to the axis of rotation A. Since the running surface 8 in the first partial region I has a smaller width BI than in the second partial region II, recesses 12, 14 are formed in the inner part 2 of the rolling-element bearing 1, axially on the running surface in the first partial region 1. The rolling-element bearing 4 is not supported by the inner part 2 at the recesses 12, 14, and lubricant, for example in the form of a lubricant mist, can directly reach the rolling-elements 4 through the recesses 12, 14, and the rolling elements 4 thus come into contact with lubricant at points that would normally be in contact with the running surface 8.

The rolling direction R is substantially perpendicular to the axis of rotation A. In order to supply all possible points of the rolling elements 4 with lubricant, according to the disclosure the running surface 8 in the first partial region I is not oriented parallel to the rolling direction R (does not extend parallel to the rolling direction R). Instead, it is oblique relative to the rolling direction R. Thus in the first partial region I the rolling elements 4 can be supplied with lubricant along their entire length L. This helps prevent a situation from occurring wherein too little or absolutely no lubricant is provided to the rolling element 4, especially in a central region 16 of the rolling element 4.

As can be further seen in FIG. 1, the recesses 12, 14 or the skewing of the running surface 8 can be configured such that the recesses 12, 14 each extend up to or beyond a center 17 of the rolling elements so that a direct lubricating of the central region 16 of the rolling elements 4 is made possible. In other words, the center of the rolling elements 4 will at some times overlie the first recess 12 and at other times overlie the second recess 14 so that no portion of the rolling element 4 is left unexposed to one of the recesses 12, 14 or left unexposed to a lubricant.

Figure 2:
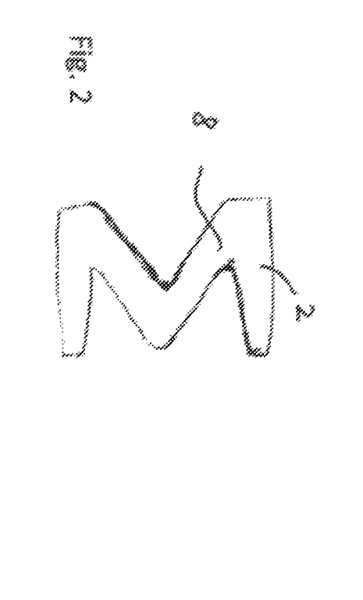
FIG. 2 is a schematic depiction of an alternative running surface shape for the rolling-element bearing of FIG. 1.

FIG. 1 shows a Z-shaped design of the running surface 8; however another axially oblique design can be selected for the running surfaces 8. Thus, for example, FIG. 2 shows a configuration of the raceway 8 that has a double skewing in the form of a serration so that the running surfaces 8 assume an M-shaped design. This configuration also helps ensure a particularly good guiding of lubricant onto the rolling elements 4.

Figure 3A:
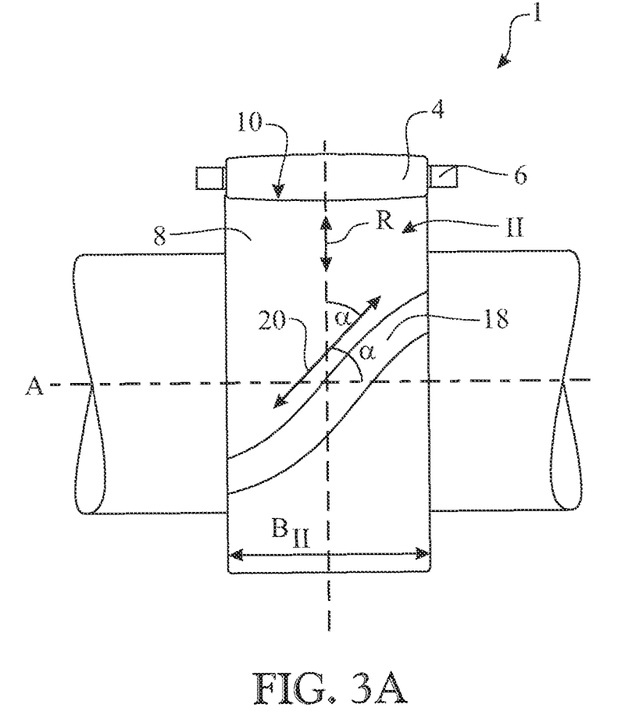
FIG. 3a is a schematic plan view of part of a rolling-element bearing according to a second exemplary embodiment of the disclosure, the part having a lubrication channel.

The second partial region II of the rolling-element bearing 1 may be at least as wide as the rolling elements 4 are long and support the rolling elements 4. In order to provide lubrication for the rolling elements 4 in this second partial region II, a lubricant channel 18, as depicted, for example, in FIG. 3a, can be formed in the second partial region II. In this example, the lubricant channel 18 extends over the entire width BIT of the inner part 2 so that lubricant can be guided onto the rolling-element bearing from both axial sides. Furthermore, it can be seen in FIG. 3a that a longitudinal direction 20 of the lubricant channel 18 is neither parallel to the axis of rotation A nor perpendicular to the direction of movement R of the rolling element 4, but the lubricant channel 18 runs at an angle α to these directions so that the rolling elements 4 are always at least partially supported by the running surface 8 of the inner part 2. Furthermore, when the bearing part rotates in a certain direction, the angled orientation of the lubricant channel 18 generates a pumping action and pumps the lubricant along the lubricant channel 18.

Figure 3B:
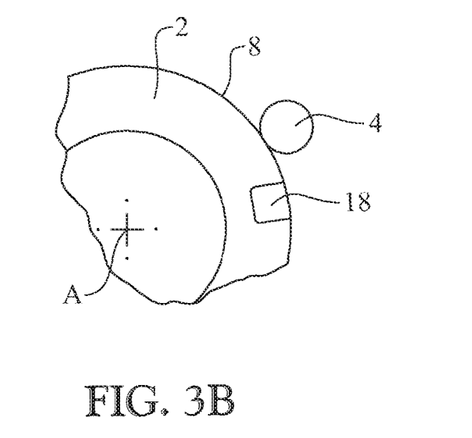

As can be seen in particular in the top view of FIG. 3b, the lubricant channel 18 is open at the running surface 8 so that lubricant can be dispensed from the lubricant channel 18 onto the rolling elements 4 along the entire length of the lubricant channel 18.

Figure 3C:
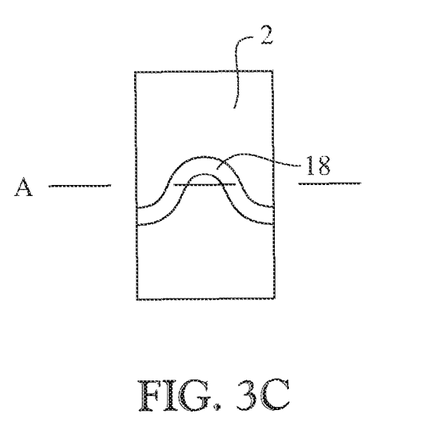

The lubricant channel 18 itself can be either straight or, as depicted, curved. It is also possible for the lubricant channel to extend in an undulating or serrated manner over the width of the inner part 2 or the outer part 3. An example of such a design is depicted in FIG. 3c.

Figure 4:
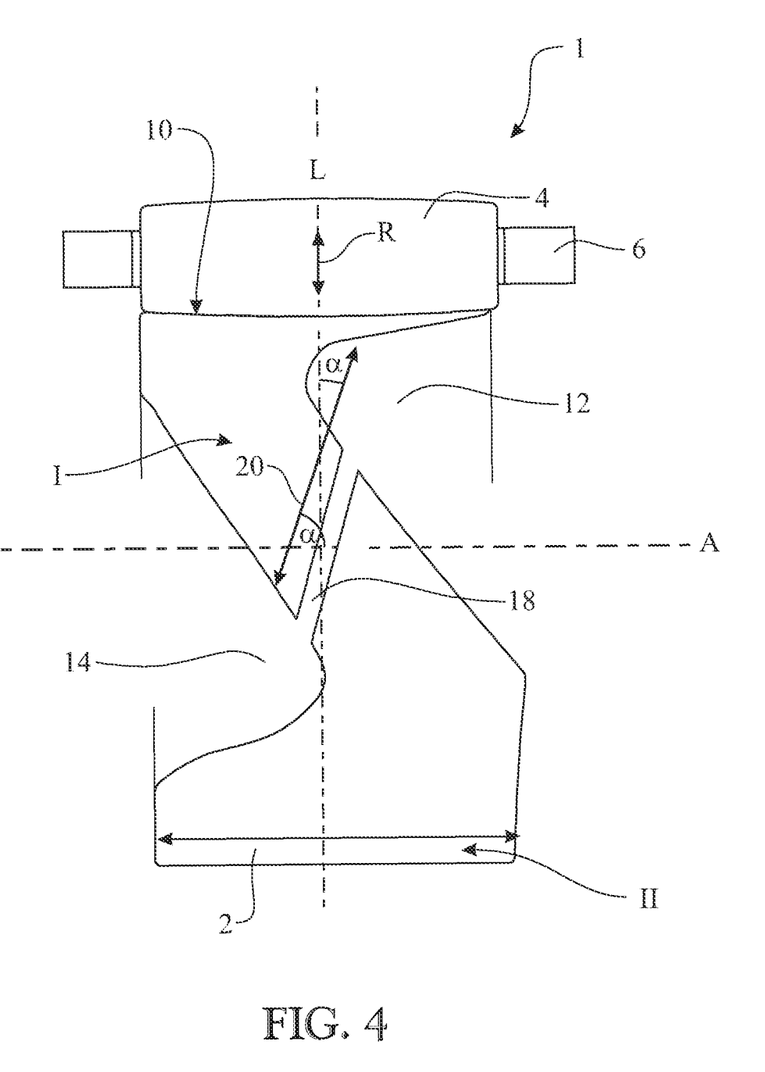
FIG. 4 is a schematic plan view of part of a rolling-element bearing according to a third exemplary embodiment of the disclosure.

As depicted in FIG. 4, the lubricant channel 18 can be formed in the first partial region I instead of or in addition to the second partial region II. In this case, the longitudinal direction 20 of the lubricant channel 18 is angled relative to both the axis of rotation A and to the rolling-movement direction R of the rolling elements 4. This helps ensure that the rolling elements 4 are always supported along at least a large part of their contact line 10 by the running surface 8 of the inner part 2.

Figure 6:
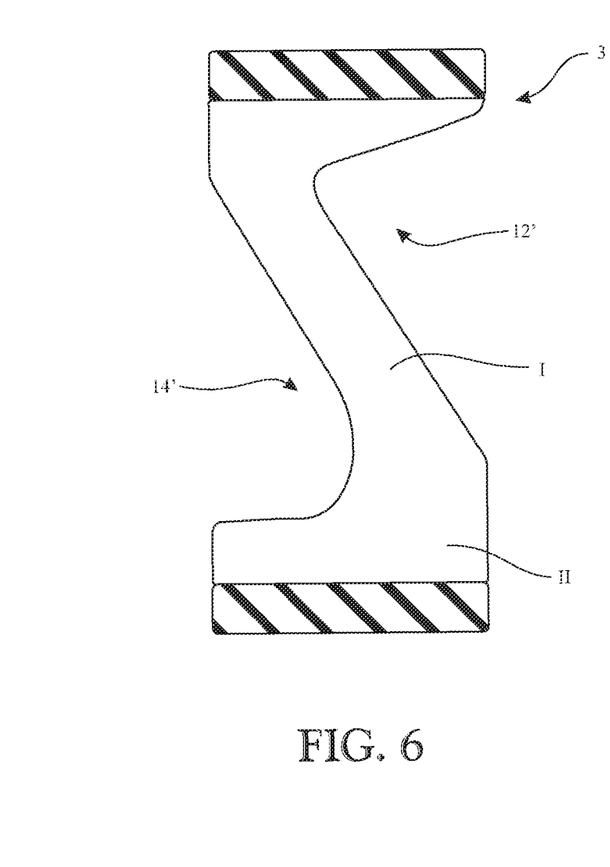
FIG. 6 is a sectional elevational view of an embodiment of the outer part of the rolling-element bearing of FIG. 1.

The disclosed rolling-element bearing 1 significantly improves lubricant supply in rolling-element bearings with line contact. The obliquely extending running surfaces in a partial region I of the rolling-element bearing 1 permits lubricant to be guided directly onto the rolling elements 4. Of course the disclosed configurations of the rolling-element bearing 1 can be formed both on the inner part 2 and on the outer part 3. An embodiment of the outer part 3 having an obliquely running partial region is illustrated in FIG. 6. However, even if in the Figures only the inner part 2 or the outer part 3 is equipped with the corresponding obliquely extending running surface 8, it is obvious to a person skilled in the art that both the inner and outer parts can be provided with such running surfaces.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Rolling-element bearing
2 Inner part
4 Rolling elements
6 Cage
8 Running surface
10 Contact line
12, 14 Recesses
16 Central region of the rolling elements
17 Center of the rolling elements
18 Lubricant channel
20 Longitudinal direction of the lubricant channel
A Axis of rotation
R Rolling direction of the rolling elements
I First partial section
II Second partial section
BI Width of the running surface in the first partial section
BII Width of the running surface in the second partial section
L Length of the rolling elements

We claim:
1. A rolling-element bearing with line contact comprising:
a bearing outer part having a running surface;
a bearing inner part having a running surface; and
at least one rolling element disposed between the bearing inner part and the bearing outer part, the at least one rolling element making line contact with the running surface of the bearing outer part and making line contact with the running surface of the bearing inner part,
wherein the at least one rolling element has an axial rolling-element length, the running surface of the bearing outer part has an axial outer running surface width, and the running surface of the bearing inner part has an axial inner running surface width,
wherein the outer running surface width and/or the inner running surface width is narrower at least in a first circumferential partial region than the rolling-element length, and
wherein in the first partial region the bearing outer part running surface or the bearing inner part running surface or both the bearing outer part running surface and the bearing inner part running surface extends obliquely to a rolling direction of the at least one rolling element.

2. The rolling-element bearing according to claim 1, wherein in a second circumferential partial region the bearing outer part running surface or the bearing inner part running surface or both the bearing outer part running surface and the bearing inner part running surface extends substantially parallel to the rolling direction of the at least one rolling element.

3. The rolling-element bearing according to claim 2, wherein the outer running surface width and/or the inner running surface width is greater than or equal to the rolling-element length at least in the second circumferential partial region.

4. The rolling-element bearing according to claim 1, wherein the bearing outer part running surface or the bearing inner part running surface or both the bearing outer part running surface and the bearing inner part running surface includes an undulation or serration in the axial direction at least in the first partial region.

5. The rolling-element bearing according to claim 1, wherein the bearing outer part running surface or the bearing inner part running surface or both the bearing outer part running surface and the bearing inner part running surface has a Z-shape, an N-shape, or an M-shape at least in the first partial region.

6. The rolling-element bearing according to claim 1, wherein the bearing inner part running surface or the bearing outer part running surface includes at least one lubricant channel at least partially open to the running surface.

7. The rolling-element bearing according to claim 6, wherein the lubricant channel is formed in the first partial region.

8. The rolling-element bearing according to claim 6, wherein the lubricant channel is formed in the second partial region.

9. The rolling-element bearing according to claim 6, wherein the at least one rolling element is supported by the running surface of the inner bearing part or by the running surface of the outer bearing part at least along a part of the contact line over the entire circumference of the rolling-element bearing.

10. The rolling-element bearing according to claim 6, wherein the lubricant channel extends at an angle to the line contact of the rolling elements.

11. The rolling-element bearing according to claim 1, wherein the running surface of the bearing inner part or the running surface of the bearing outer part or the running surface of the bearing inner part and the running surface of the bearing outer part is configured as a bearing assembly of an unbalanced shaft.

12. The rolling-element bearing according to claim 1,
wherein the outer running surface width or the inner running surface width or both the outer running surface width and the inner running surface width is greater than or equal to the rolling-element length at least in the second circumferential partial region,
wherein the bearing outer part running surface or the bearing inner part running surface or both the bearing outer part running surface and the bearing inner part running surface includes an undulation or serration in the axial direction at least in the first partial region,
wherein the running surface of the bearing inner part or the running surface of the bearing outer part includes at least one partially open lubricant channel, and
wherein the lubricant channel extends at an angle to the line contact of the rolling elements.

13. A rolling-element bearing with line contact comprising:
a first circumferential portion and a second circumferential portion;
a bearing outer part having a running surface;
a bearing inner part having a running surface; and
a rolling element disposed between the bearing inner part and the bearing outer part, the rolling element making line contact with the running surface of the bearing outer part and making line contact with the running surface of the bearing inner part,
wherein a width of the bearing outer part running surface in the first circumferential portion is less than an axial length of the rolling-element length or a width of the bearing inner part running surface in the first circumferential portion is less than the axial length of the rolling-element or both the width of the bearing outer part running surface in the first circumferential portion and the width of the bearing inner part running surface in the first circumferential portion are less the axial length of the rolling-element, and
wherein
the bearing outer part running surface in the first circumferential portion has a first end and a second end, the first end of the bearing outer part running surface in the first circumferential portion being circumferentially and axially offset from the second end of the bearing outer part running surface in the first circumferential portion, or
the bearing inner part running surface in the first circumferential portion has a first end and a second end, the first end of the bearing inner part running surface in the first circumferential portion being circumferentially and axially offset from the second end of the bearing inner part running surface in the first circumferential portion, or
the bearing outer part running surface in the first circumferential portion has a first end and a second end, the first end of the bearing outer part running surface in the first circumferential portion being circumferentially and axially offset from the second end of the bearing outer part running surface in the first circumferential portion and the bearing inner part running surface in the first circumferential region has a first end and a second end, the first end of the bearing inner part running surface in the first circumferential portion being circumferentially and axially offset from a second end of the bearing inner part running surface in the first circumferential portion.

14. The rolling-element bearing according to claim 13, wherein the bearing outer part running surface or the bearing inner part running surface or both the bearing outer part running surface and the bearing inner part running surface includes an undulation or serration in the axial direction at least in the first circumferential portion.

15. The rolling-element bearing according to claim 13, wherein the bearing outer part running surface or the bearing inner part running surface or both the bearing outer part running surface and the bearing inner part running surface has a Z-shape, an N-shape, or an M-shape at least in the first circumferential portion.

16. The rolling-element bearing according to claim 13, wherein the inner part or the outer part includes at least one lubricant channel at least partially open to the running surface.

17. The rolling-element bearing according to claim 16, wherein the lubricant channel is formed in the first circumferential portion.

\* \* \* \* \*